(12) United States Patent
Jywe et al.

(10) Patent No.: US 10,571,259 B2
(45) Date of Patent: Feb. 25, 2020

(54) OPTICAL DETECTING APPARATUS FOR DETECTING A DEGREE OF FREEDOM ERROR OF A SPINDLE AND A DETECTING METHOD THEREOF

(71) Applicant: National Formosa University, Yunlin (TW)

(72) Inventors: Wen-Yuh Jywe, Yunlin (TW);
Tung-Hsien Hsieh, Yunlin (TW);
Zhong-Liang Hsu, Kaohsiung (TW);
Chia-Ming Hsu, Changhua (TW);
Yu-Wei Chang, Taichung (TW); Sen-Yi Huang, Yunlin (TW); Tung-Hsing Hsieh, Yunlin (TW)

(73) Assignee: National Formosa University, Yunlin County (TW)

( * ) Notice: Subject to any disclaimer, the term of this patent is extended or adjusted under 35 U.S.C. 154(b) by 439 days.

(21) Appl. No.: 15/627,411

(22) Filed: Jun. 19, 2017

(65) Prior Publication Data
US 2018/0299263 A1 Oct. 18, 2018

(30) Foreign Application Priority Data
Apr. 17, 2017 (TW) .............................. 106112744 A (51) Int. Cl.
| | | |
|---|---|---|
| *G01B 11/00* | (2006.01) | |
| *G01B 11/26* | (2006.01) | |
| *B23Q 17/24* | (2006.01) | |
| *G01B 11/27* | (2006.01) | |
| *B23Q 17/22* | (2006.01) | |
| *G01B 21/04* | (2006.01) | |
| *H01S 3/00* | (2006.01) | |
| *B23Q 17/00* | (2006.01) | |

(52) U.S. Cl.
CPC .......... *G01B 11/26* (2013.01); *B23Q 17/2233* (2013.01); *B23Q 17/24* (2013.01); *G01B 11/27* (2013.01); *G01B 21/042* (2013.01); *B23Q 2017/001* (2013.01); *H01S 3/00* (2013.01)

(58) Field of Classification Search
USPC ................................................... 356/139.03
See application file for complete search history.

(56) References Cited

U.S. PATENT DOCUMENTS

| | | | | |
|---|---|---|---|---|
| 4,942,539 A | * | 7/1990 | McGee ................. | B25J 9/1697 348/42 |
| 5,046,851 A | * | 9/1991 | Morgan ................ | G01B 11/00 29/720 |

(Continued)

*Primary Examiner* — James R Hulka (57) ABSTRACT

An optical detecting apparatus for detecting a degree of freedom error of a spindle and has a standard bar and a sensor module, and is assembled between a spindle and a rotating platform of a powered machinery. The standard bar has a rod lens and a reflection face. The sensor module has two detecting groups, an oblique laser head, and a reflected spot displacement sensor. Each detecting group emits a laser light through the rod lens along the X-axis and the Y-axis of the powered machinery. The oblique laser head emits an oblique laser light to the reflected spot displacement sensor. When the spindle of the powered machinery generates errors after rotating, the sensor module receives the changes of the laser lights to obtain the displacement change signals of the standard bar for a calculation unit to detect the errors between the spindle and the rotating platform.

8 Claims, 9 Drawing Sheets

(56) References Cited

U.S. PATENT DOCUMENTS

| | | | | |
|---|---|---|---|---|
| 5,278,634 A * | 1/1994 | Skunes | ............... | G01B 11/272 |
| | | | | 356/400 |
| RE38,025 E * | 3/2003 | Skunes | ............... | G01B 11/272 |
| | | | | 356/400 |
| 8,203,702 B1 * | 6/2012 | Kane | ......................... | G01J 3/02 |
| | | | | 356/139.05 |
| 8,306,747 B1 * | 11/2012 | Gagarin | .................. | G01C 7/04 |
| | | | | 701/408 |
| 8,643,850 B1 * | 2/2014 | Hartman | ................ | G01S 5/163 |
| | | | | 342/29 |
| 10,101,454 B2 * | 10/2018 | Pearlman | .............. | G01S 17/023 |
| 10,246,742 B2 * | 4/2019 | Rothberg | .............. | H01S 3/1118 |
| 10,283,928 B2 * | 5/2019 | Rothberg | .............. | H01S 3/1115 |
| 2009/0228204 A1 * | 9/2009 | Zavoli | .................... | G01C 21/30 |
| | | | | 701/532 |
| 2016/0252325 A1 * | 9/2016 | Sammut | .................... | F41G 1/38 |
| | | | | 42/122 |
| 2018/0175582 A1 * | 6/2018 | Rothberg | .............. | H01S 3/1611 |
| 2018/0322348 A1 * | 11/2018 | Sweet, III | .......... | G06K 9/00805 |

* cited by examiner

OPTICAL DETECTING APPARATUS FOR DETECTING A DEGREE OF FREEDOM ERROR OF A SPINDLE AND A DETECTING METHOD THEREOF

BACKGROUND OF THE INVENTION

1. Field of the Invention

The present invention relates to an optical detecting apparatus for detecting a degree of freedom error of a spindle and a detecting method thereof, and more particularly to an optical detecting apparatus that may reduce the cost of assembly and use and to a detecting method that may be used to detect the precision detection of different kinds of powered machinery.

2. Description of the Prior Arts

Figure 9:
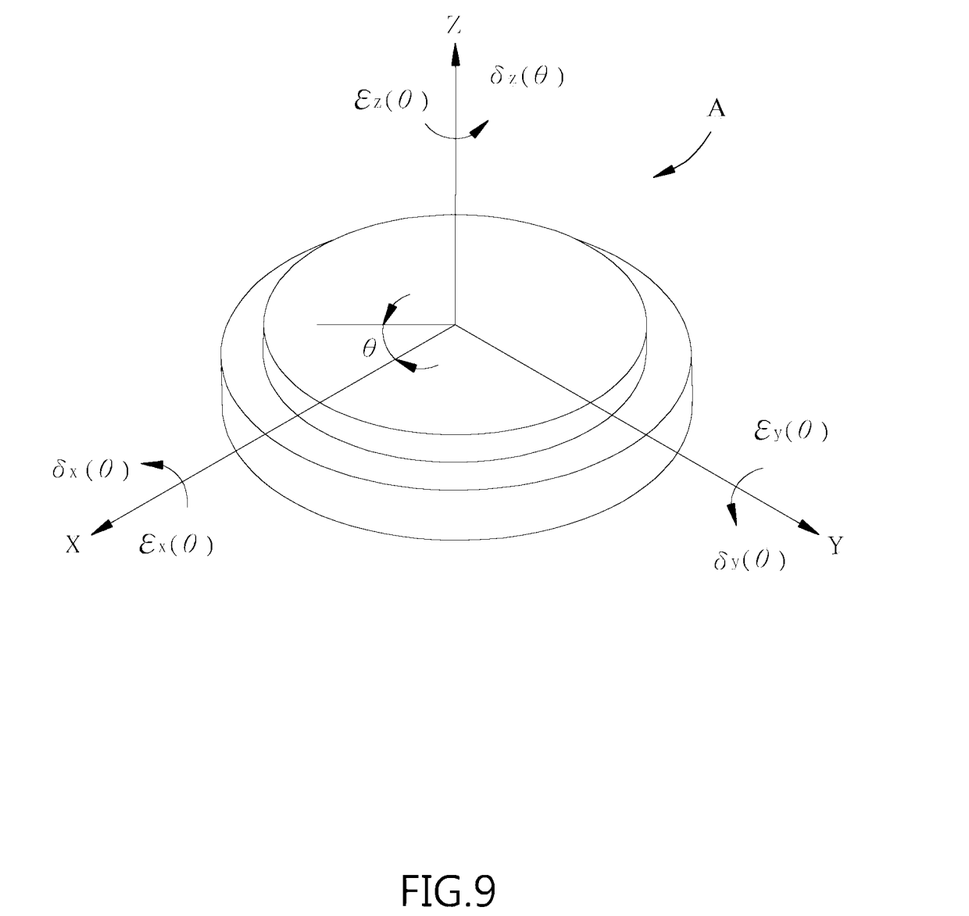
FIG. 9 is a perspective view of a shat and a rotation axis of rotating platform of a machine tool in accordance with the prior art, shown an error source between the spindle and the rotation axis.

With reference to FIG. 9, a conventional powered machinery has a spindle and a rotating platform, and the rotating platform has a rotation axis. An error source A between the spindle and the rotation axis of the rotating platform can be divided into six parts, the spindle has three position errors $(\delta_x(\theta),\delta_y(\theta),\delta_z(\theta))$ and an angle deflection error (wobble $'\alpha$). When detecting the spindle, a radial error of the spindle is detected by the positions errors of $\delta_x(\theta),\delta_y(\theta)$, and an axial error of the spindle is detected by the other position error of $\delta_z(\theta)$. Furthermore, a wobble condition of the spindle is detected by the angle deflection error (wobble $'\alpha$). The rotation axis of the rotating platform has tree angle positioning errors $(\varepsilon_x(\theta),\varepsilon_y(\theta),\varepsilon_z(\theta))$ of X axis, Y axis, and Z axis.

There are two detecting methods for the spindle of the conventional powered machinery, respectively a static detecting method and a dynamic detecting method. The static detecting method is detected by using a standard bar and a dial indicator. A rotation error of the spindle is detected by the value of the dial indicator. However, the static detecting method has a major shortcoming of the measurement without carried out under the actual speed and the error includes the assembly error of the standard bar. Then, the static detecting method cannot detect the real rotation accuracy of the spindle.

The dynamic detecting method may overcome the above-mentioned shortcoming of the static detecting method, and may use a high speed rotational spindle dynamic deflection measuring instrument (LION TARGA III PCB) to detect the conventional powered machinery. The above-mentioned measuring instrument has five non-contact capacitive sensors to detect the rotation error, the angle deflection error, the radial error, and the axial error of the spindle under the actual speed. The dynamic detecting method is usually based on the American Society for Testing and Materials (ASTM) standard number (ASTM B5.54) standards for testing. However, the price of the non-contact capacitive sensors is quite expensive, so it is not easy to buy.

When the conventional powered machinery is used to process the aerospace elements, since most of the aerospace elements are efficiently removed from solid blocks by a tool of the conventional powered machinery, and most of the processing time is very long. During the process of the conventional powered machinery, the internal and external heat sources will cause the structures or components of the conventional powered machinery thermal deformation, resulting in deviation of process positioning accuracy. This may make the spindle generate eccentricity after rotating a period of time, and cause the spindle loss the processing accuracy by the axial and radial movement and the deflection error of the spindle. The error of the spindle must be resolved in order to improve the processing accuracy. However, as the above-mentioned, the dynamic detecting method is used the expensive high speed rotational spindle dynamic deflection measuring instrument (LION TARGA III PCB) to detect the errors of the spindle under a dynamic condition. The cost of the LION TARGA III PCB is NT $1 to 2 million, and this will influence the procurement of the users and cannot enhance the accuracy of processing by analyzing the errors of the spindle of the conventional powered machinery under the high-speed rotation condition.

To overcome the shortcomings, the present invention provides a method of detecting a dynamic path of a five-axis machine tool to mitigate or obviate the aforementioned problems.

SUMMARY OF THE INVENTION

The main objective of the present invention is to provide an optical detecting apparatus for detecting a degree of freedom error of a spindle and a detecting method thereof, and more particularly to an optical detecting apparatus that may reduce the cost of assembly and use and to a detecting method that may be used to detect the precision detection of different kinds of powered machinery.

The optical detecting apparatus for detecting a degree of freedom error of a spindle and a detecting method in accordance with the present invention has a standard bar and a sensor module, and is assembled between a spindle and a rotating platform of a powered machinery. The standard bar has a rod lens and a reflection face. The sensor module has two detecting groups, an oblique laser head, and a reflected spot displacement sensor. Each detecting group emits a laser light through the rod lens along the X-axis and the Y-axis of the powered machinery. The oblique laser head emits an oblique laser light to the reflected spot displacement sensor. When the spindle of the powered machinery generates errors after rotating, the sensor module receives the changes of the laser lights to obtain the displacement change signals of the standard bar for a calculation unit to detect the errors between the spindle and the rotating platform.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 5, an optical detecting apparatus for detecting a degree of freedom error of a spindle in accordance with the present invention is deposited between a spindle 11 and a platform 12 of a machine tool 10. The machine tool 10 at least has three linear axes (X-, Y- and Z-axes). Preferably, the machine tool 10 is a multi-axis machine tool and the platform 12 is a rotating platform.

The optical detecting apparatus has a standard bar 20, a sensor module 30, and a calculation unit 40. The sensor module 30 is operated with the standard bar 20, and the calculation unit 40 is used to calculate the detecting result of the sensor module 30 relative to the standard bar 20 by receiving the error signal of the sensor module 30 in electrical or wireless connection. In the present invention, the standard bar 20 is connected to the spindle 11 and the sensor module 30 is mounted on the platform 12.

The standard bar 20 is a straight rod which is joined to a bottom end of the spindle 11 in a vertical and coaxial manner, and has a rod lens 21 and a reflection face 22. The rod lens 21 is a light transmitting cylinder, which may be a section on the standard bar 20 or an entire of the standard rod 20. In the present invention, the rod lens 21 constitutes the entire standard bar 20, and the reflection face 22 is formed at a free end of the rod lens 21 by coating, that is, the free end of the rod lens 21 is the bottom end of the standard test bar 20. Furthermore, the reflection face 22 is a horizontal plane.

The sensor module 30 has a magnetic mount 31, a supporting base 32, a sensor frame 33, an primary detecting group 34, a minor detecting group 35, an oblique laser head 36, and a reflected spot displacement sensor 37.

The magnetic mount 31 is deposited on a top face of the platform 12, and the supporting base 32 is deposited on the magnetic mount 31. The sensor frame 33 is deposited around the supporting base 32, and has four mounting boards 331. Two of the mounting boards 331 are deposited on the supporting base 32 and face to each other along the X-axis of the machine tool 10, and the other two mounting boards 331 are deposited on the supporting base 32 and face to each other along the Y-axis of the machine tool 10. Each one of the mounting boards 331 is a longitudinal board, and a measurement area 50 is formed between the mounting boards 331. The standard bar 20 extends into a center of the measurement area 50 between the mounting boards 331.

The primary detecting group 34 is deposited on an upper portion of the sensor frame 33 around the measurement area 50, and has a first laser head 341, a second laser head 342, a first spot displacement sensor 343, and a second spot displacement sensor 344. The first laser head 341 and the first spot displacement sensor 343 are respectively mounted on the two mounting boards 331 of the sensor frame 33 that align with the X-axis of the machine tool 10, and the first laser head 341 has a center facing to a center of the first spot displacement sensor 343. The second laser head 342 and the second spot displacement sensor 344 are respectively mounted on the two mounting boards 331 of the sensor frame 33 that align with the Y-axis of the machine tool 10, and the second laser head 342 has a center facing to a center of the second spot displacement sensor 344.

Figure 5:
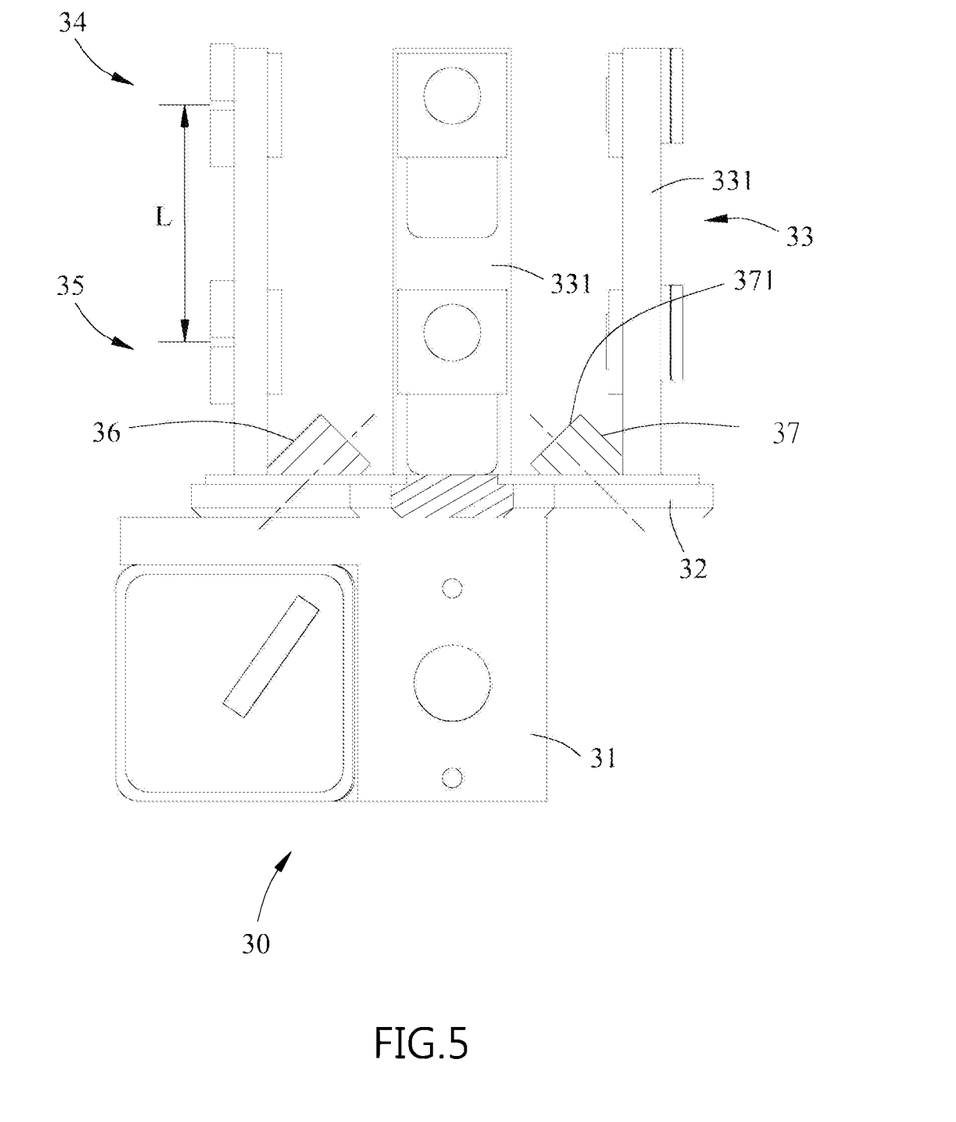
FIG. 5 is a front side view in partial section of the optical detecting apparatus in FIG. 2.

The minor detecting group 35 is deposited on a lower portion of the sensor frame 33 around the measurement area 50 below the primary detecting group 34, and has a third laser head 351, a fourth laser head 352, a third spot displacement sensor 353, and a fourth spot displacement sensor 354. The third laser head 351 and the third spot displacement sensor 353 are respectively mounted on the two mounting boards 331 of the sensor frame 33 that align with the X-axis of the machine tool 10, and the third laser head 351 has a center facing to a center of the third spot displacement sensor 353. The fourth laser head 352 and the fourth spot displacement sensor 354 are respectively mounted on the two mounting boards 331 of the sensor frame 33 that align with the Y axis of the machine tool 10, and the fourth laser head 352 has a center facing to a center of the fourth spot displacement sensor 354. The primary detecting group 34 and the minor detecting group 35 are deposited on the sensor frame 33 with an alignment of position up and down. With further reference to FIG. 5, an assembling length L is defined between centers of the detecting groups 34, 35 along the Z-axis of the machine tool 10.

The oblique spot laser head 36 and the reflected spot displacement sensor 37 are deposited on a top of the supporting base 32 in the measurement area 50, and align with the X-axis of the machine tool 10. The oblique spot laser head 36 is an obliquely cylindrical element and has a free end extending inwardly and upwardly, and the reflected spot displacement sensor 37 is an obliquely cylindrical element and has a free end extending inwardly and upwardly and a receiving face 371 deposited on the free end of the reflected spot displacement sensor 37. Furthermore, with reference to FIG. 6, an angle between an axis line of the oblique spot laser head 36 and the horizontal plane is 45 degrees, and an angle between the an axis line of the reflected spot displacement sensor 37 and the horizontal plane is 45 degrees.

Figure 1:
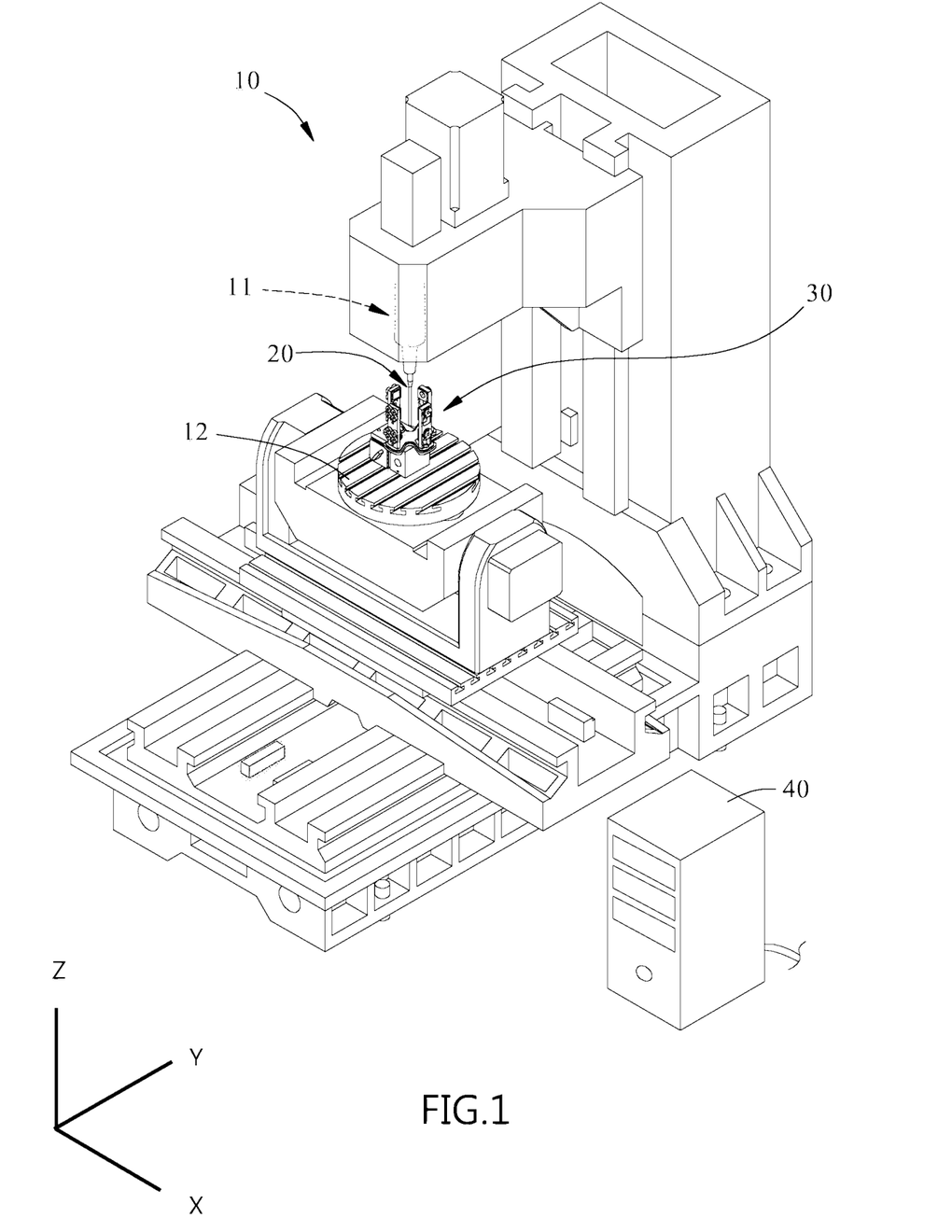
FIG. 1 is a perspective view of an optical detecting apparatus for detecting a degree of freedom error of a spindle in accordance with the present invention, mounted on a machine tool.
Figure 2:
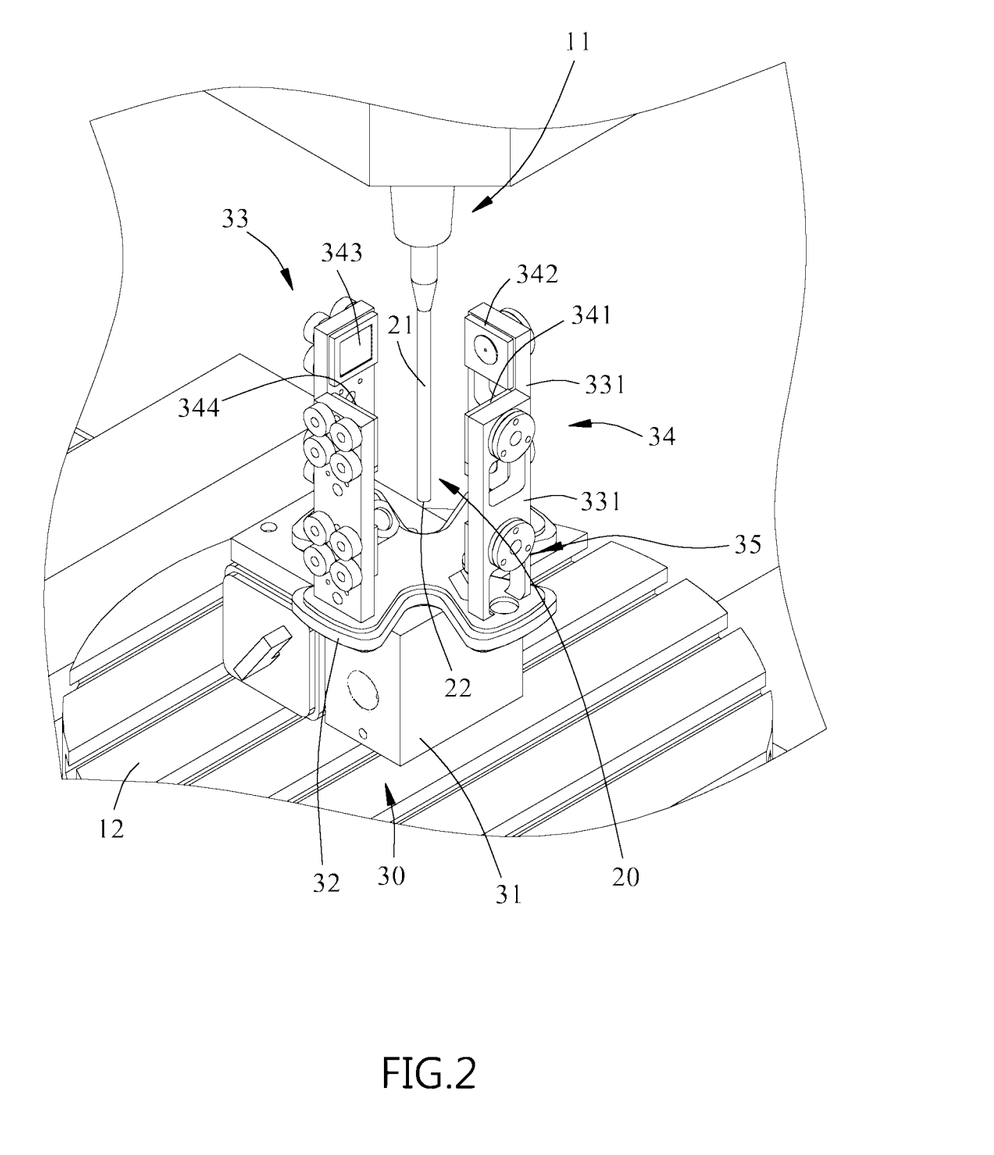
FIG. 2 is an enlarged perspective view of the optical detecting apparatus in FIG. 1.
Figure 3:
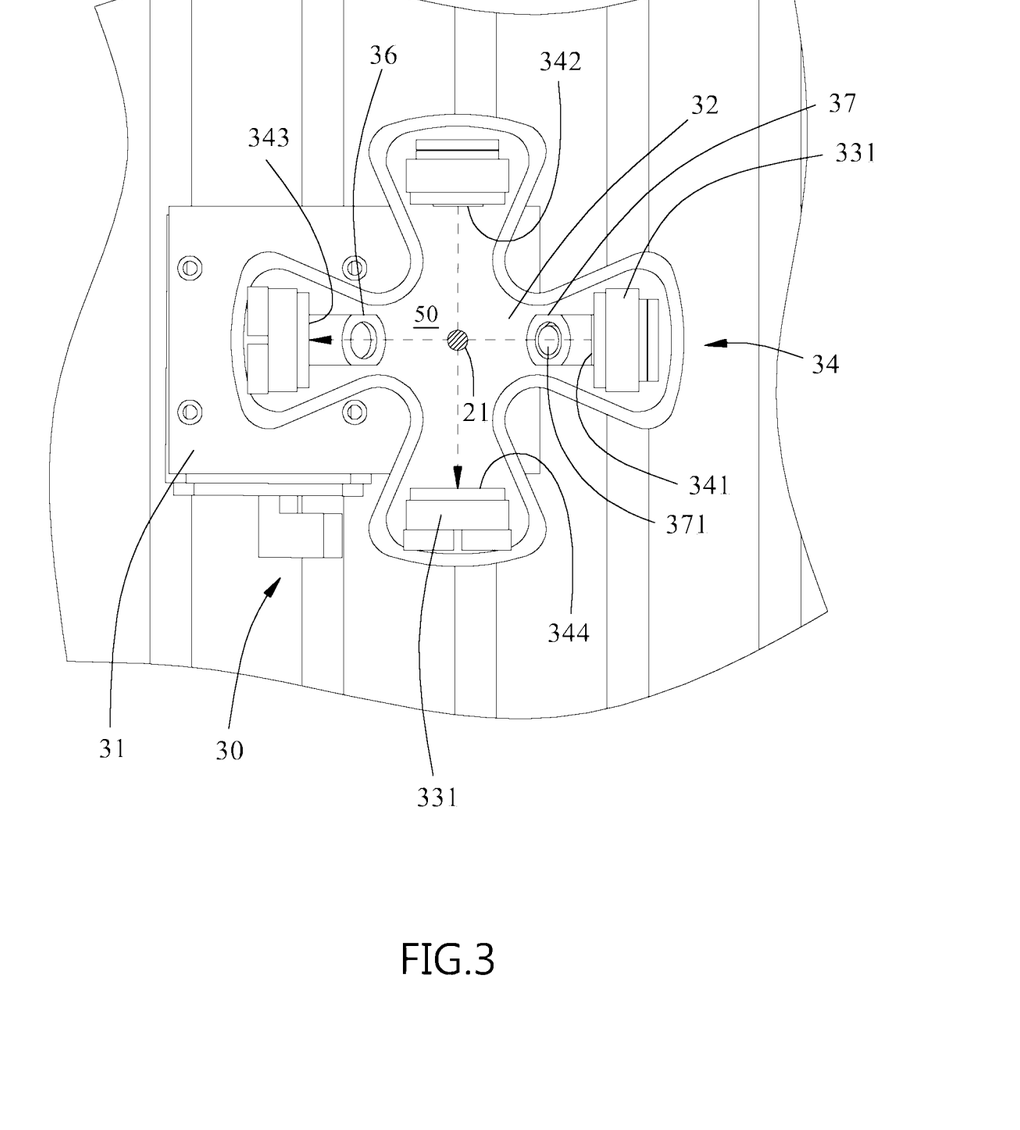
FIG. 3 is a top side view in partial section of the optical detecting apparatus in FIG. 2.
Figure 6:
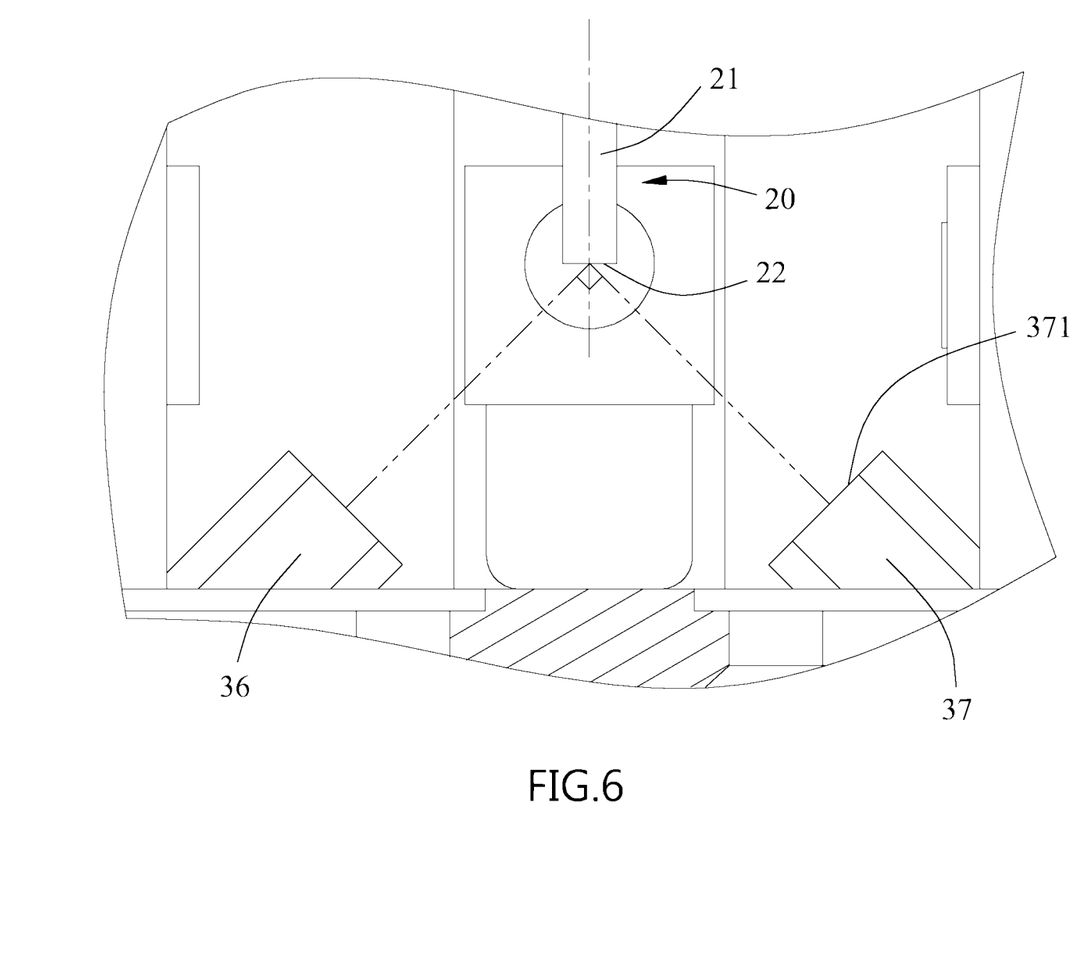
FIG. 6 is an enlarged and operational front side view in partial section of the optical detecting apparatus in FIG. 5.

Each one of the spot displacement sensors 343, 344, 353, 354, 37 may be selected from one-dimensional or two-dimensional photoelectric sensor, position sensor, CCD sensor, CMOS sensor and other non-contact photoelectric sensor. With reference to FIG. 3, before starting the machine tool 10, the standard bar 20 and the sensor module 30 are deposited on the zero positions, and the laser lights of the first laser head 341 and the second laser head 342 are positive crossed at a center of the rod lens 21 adjacent to an upper portion of the rod lens 21, and the laser lights of the third laser head 351 and the fourth laser head 352 are positive crossed at the center of the rod lens 21 adjacent to a lower portion of the rod lens 21. With reference to FIG. 6, the laser light of the oblique laser head 36 emits on a center of the reflection face 22 and reflects to a center of the receiving face 371 of the reflected spot displacement sensor 37.

Figure 7:
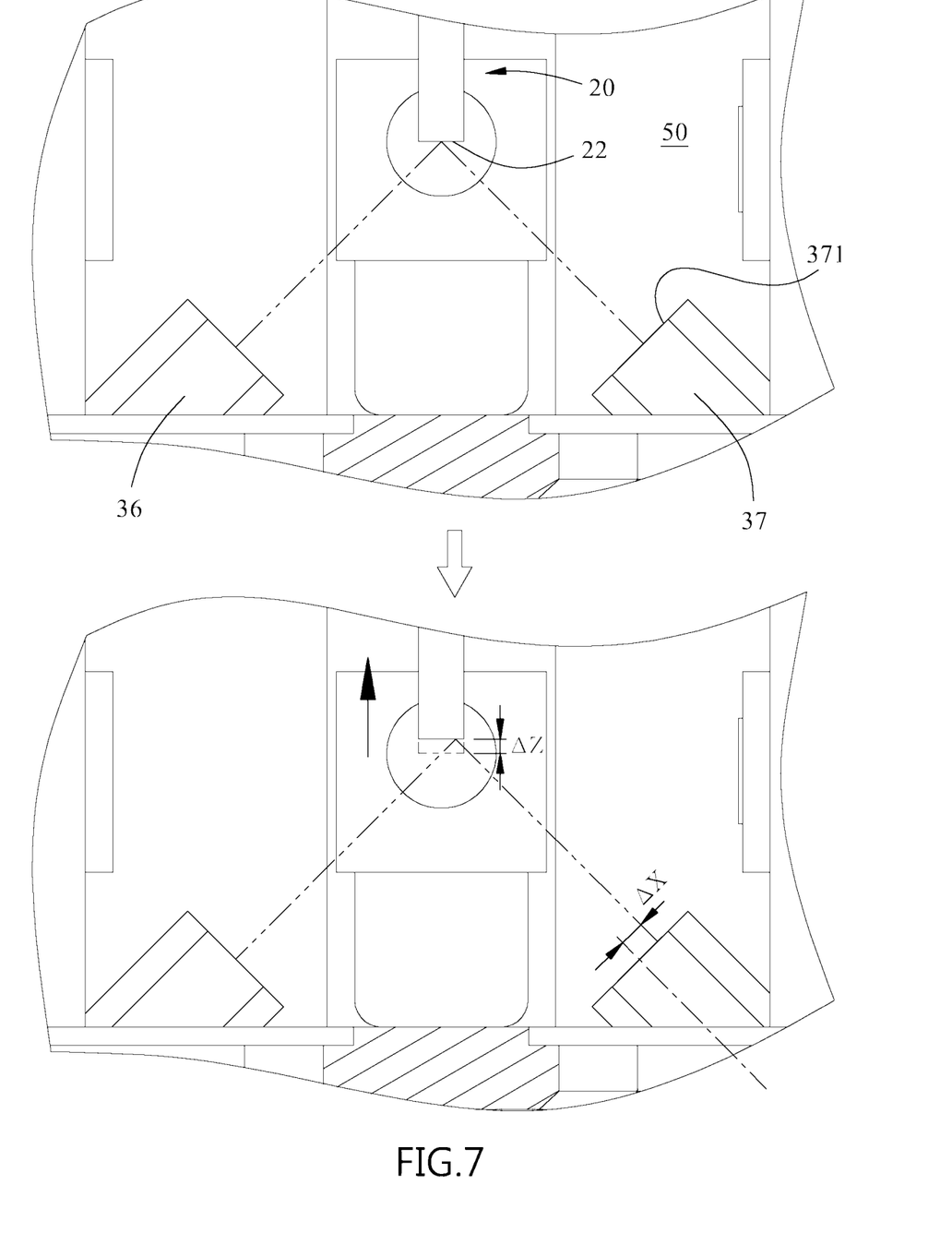
FIG. 7 is an operational front side view in partial section of the optical detecting apparatus in FIG. 6, using a standard bar.

In the present invention, before using the machine tool 10, the standard bar 20 can be deposited at the center of the measurement area 50 by an instrument and a position of the reflection face 22 is adjusted upwardly or downwardly to enable the laser light of the oblique laser head 36 emitting on the center of the reflection face 22 and reflecting on the center of the receiving face 371 of the reflected spot displacement sensor 37. With reference to FIG. 7, the standard bar 20 is moved along the Z-axis of the machine tool 10, a distance Δz of the standard bar 20 is defined by the standard bar 20 moving along the Z-axis of the machine tool 10 and a distance Δx of the reflected laser light is defined by the reflected laser light moving relative to the center of the receiving face 371, and a ratio between the distances Δz, Δx is defined as a gain value K (K=Δz/Δx).

Figure 4:
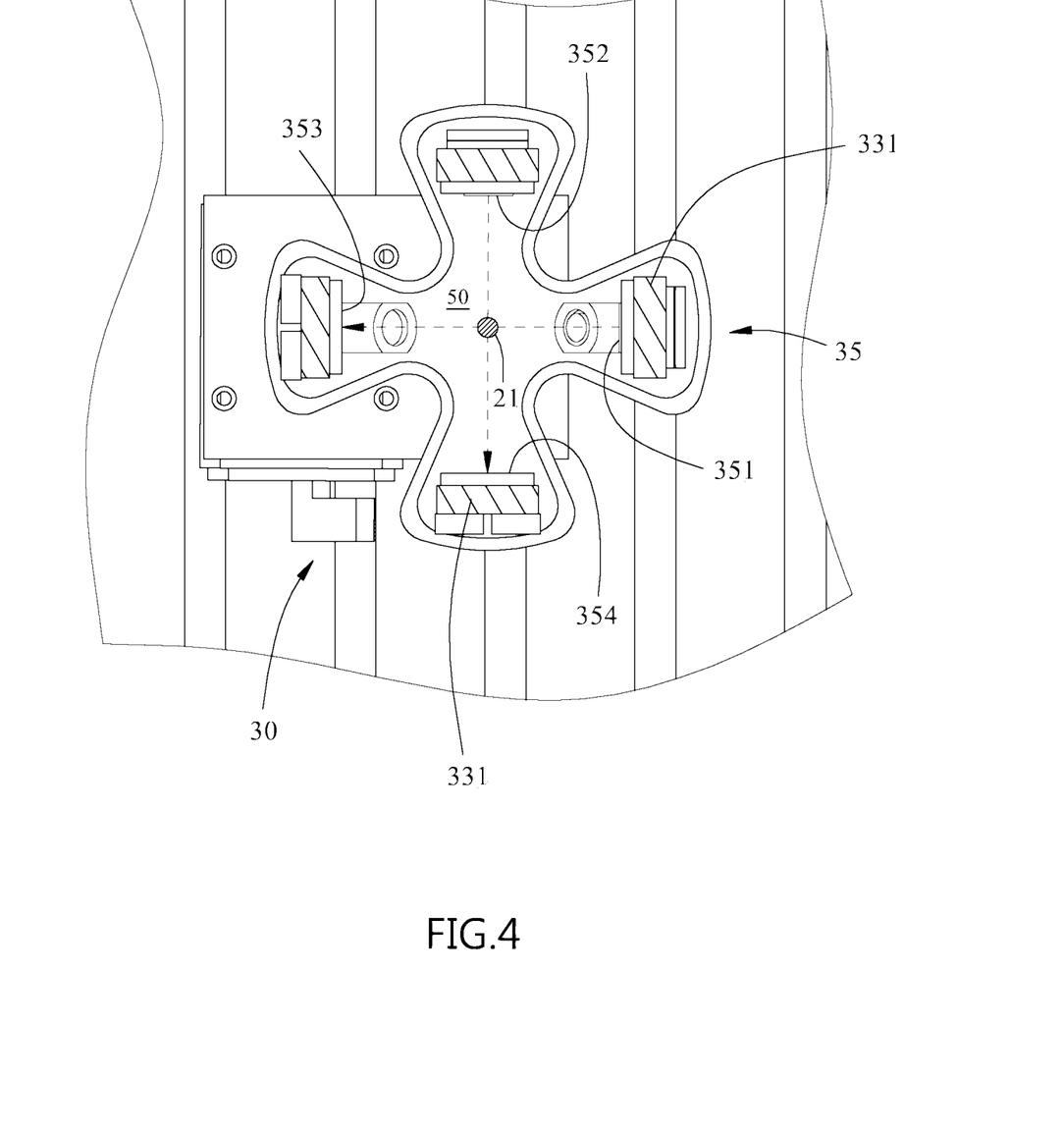
FIG. 4 is a cross-sectional top side view of the optical detecting apparatus in FIG. 2.

With reference to FIG. 3, the laser light of the first laser head 341 emits through the upper portion of the rod lens 21 and focus on the center of the first spot displacement sensor 343, and the laser light of the second laser head 342 emits through the upper portion of the rod lens 21 and focus on the center of the second spot displacement sensor 344. With reference to FIG. 4, the laser light of the third laser head 351 emits through the lower portion of the rod lens 21 and focus on the center of the third spot displacement sensor 353, and the laser light of the fourth laser head 352 emits through the lower portion of the rod lens 21 and focus on the center of the fourth spot displacement sensor 354. With reference to FIGS. 5 and 6, the laser light of the oblique laser head 36 emits on the reflection face 22 and reflects on the center of the receiving face 371 of the reflected spot displacement sensor 37 with an angle of 90 degrees.

When the spindle 11 of the machine tool 10 is rotated with a high speed, the internal components of the machine tool 10 may be thermally deformed by an internal heat source or an external heat source, so that the position of the spindle 11 is eccentric to cause the position of the standard bar 20 to move in the measurement area 50. The movement of the rod lens 21 at the lower portion of the rod lens 21 causes the two laser lights to be incident to change the focus positions on the third spot displacement sensor 353 and the fourth spot displacement sensor 354. Then, the third light spot displacement sensor 353 can measure the Y-axis displacement change Y1 of the rod lens 21 at the lower portion, and the fourth spot displacement sensor 354 can measure the X-axis displacement change X1 of the rod lens 21 at the lower portion.

When the standard bar 20 is moved in the measurement area 50 by the position of the eccentric of the spindle 11, the movement of the rod lens 21 at the upper portion of the rod lens 21 causes the two laser lights to be incident to change the focus positions on the first spot displacement sensor 343 and the second spot displacement sensor 344. Then, the first light spot displacement sensor 343 can measure the Y-axis displacement change Y2 of the rod lens 21 at the upper portion, and the second spot displacement sensor 344 can measure the X-axis displacement change X2 of the rod lens 21 at the upper portion. When the standard bar 20 is moved in the measurement area 50 by the position of the eccentric of the spindle 11, with reference to FIG. 7, the distance Δz of the standard bar 20 that is moved along the Z-axis enables the reflection face 22 moving upwardly or downwardly, and this will change the position of the reflection face 22 that reflects the laser light on the receiving face 371. Then, the receiving face 371 of the reflected spot displacement sensor 37 may detect the distance Δx of the reflected laser light that moves relative to the center of the receiving face 371.

The calculation unit 40 may a single chip or a computer, and in the present invention, the calculation unit 40 is a computer, is received the signals of the X-axis displacement change X1 and the Y-axis displacement change Y1 of the rod lens 21 at the lower portion and the distance Δx of the reflected laser light that moves relative to the center of the receiving face 371 in electrical or wireless connection, and calculated with the known values of the assembling length L and the gain value K to get the errors of the spindle 11 and the rotation axis of the platform 12.

In the present invention, the receiving face 371 of the reflected spot displacement sensor 37 is deposited with an angle of 45 degrees relative to the horizontal plane. Additionally, the angle between the receiving face 371 and the horizontal plane may be deposited with any other angles, such as 0 degree or 60 degrees, only the receiving face 371 can receive the reflected laser light of the reflection face 22. Furthermore, the angle between the axis line of the oblique spot laser head 36 and the horizontal plane is 45 degrees, and also can be any other angles, only the laser light of the oblique spot laser head 36 can emit on the reflection face 22 and reflect on the receiving face 371. The gain value K may be changed when the angles between the axis line of the oblique spot laser head 36 and the horizontal plane or the receiving face 371 and the horizontal plane are changed, and a new gain value K is needed to find via re-calibrated by the instrument.

Figure 8:
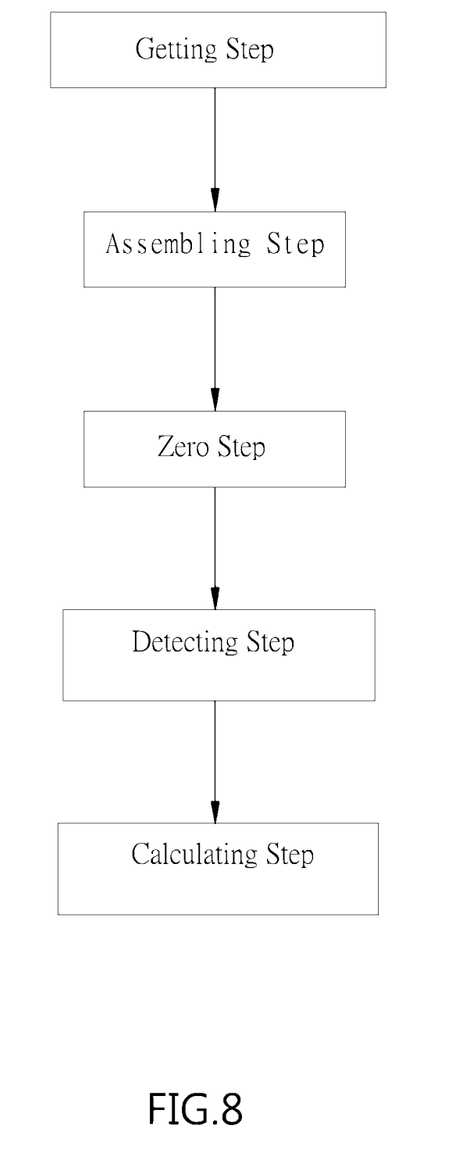
FIG. 8 is a block diagram of a detecting method for detecting a degree of freedom error of a spindle in accordance with the present invention.

With reference to FIG. 8, a detecting method in accordance with the present invention is used with the optical detecting apparatus for detecting a degree of freedom error of a spindle, and comprises a getting step, an assembling step, a zero step, a detecting step, and a calculating step.

In the getting step, the standard bar 20 of the optical detecting apparatus is deposited at the center of the measurement area 50 of the sensor module 30 by the instrument. The position of the reflection face 22 is moved upwardly or downwardly to enable the laser light of the oblique laser head 36 emitting on the center of the reflection face 22 and reflecting on the center of the receiving face of the reflected spot displacement sensor 37. Then, the standard bar 20 is moved with the instrument along the Z-axis to get a ratio between the distance Δz of the standard bar 20 moves along the Z-axis and the distance Δx of the reflected laser light that moves relative to the center of the receiving face 371 by the instrument calibration mode, and the ratio is called the gain value K. In addition, the distance Δz may be defined as a first distance and the distance Δx may be defined as a second distance.

In the assembling step, the standard bar 20 of the optical detecting apparatus is assembled on a rotating spindle of a powered machinery, such as a bottom end of the spindle 11 of the machine tool 10, and the sensor module 30 is assembled on a platform of the powered machinery, such as the platform 12 of the machine tool 10, and the machine tool 10 is a multi-axes powered machinery with X-, Y- and Z-axes, and the platform 12 may be a biaxial platform or a rotating platform.

In the zero step, the machine tool 10 is started to move the spindle 11 and the standard bar 20 to enable the standard bar 20 to move at the center of the measurement area 50 of the sensor module 30, the primary detecting group 34 is deposited around the rod lens 21 at the upper portion of the rod lens 21, the minor detecting group 35 is deposited around the rod lens 21 at the lower portion of the rod lens 21. The laser light of the first head 341 emits through the rod lens 21 and focus on the center of the first spot displacement sensor 343, the laser light of the second head 342 emits through the rod lens 21 and focus on the center of the second spot displacement sensor 344, the laser light of the third head 351 emits through the rod lens 21 and focus on the center of the third spot displacement sensor 353, the laser light of the fourth head 352 emits through the rod lens 21 and focus on the center of the fourth spot displacement sensor 354, and the laser light of the oblique laser head 36 emits on the center of the reflection face 21 of the standard bar 20 and reflects on the center of the receiving face 37 of the reflected spot displacement sensor 37.

In the detecting step, the spindle 11 is rotated by the machine tool 10, when the position of the standard bar 20 in the sensor module 30 is changed with the eccentricity of the spindle 11 that is rotated at high speed, a Y-axis displacement change Y1 of the rod lens 21 at the lower portion is detected by the third spot displacement sensor 353, a X-axis displacement change X1 of the rod lens 21 at the lower portion is detected by the fourth spot displacement sensor 354, a Y-axis displacement change Y2 of the rod lens 21 at the upper portion is detected by the first spot displacement sensor 343, a X-axis displacement change X2 of the rod lens 21 at the upper portion is detected by the second spot displacement sensor 342, and a distance $\Delta x$ of the reflected laser light that moves relative to the center of the receiving face 371 is detected by the receiving face 371 of the reflected spot displacement sensor 37.

In the calculating step, the signals of the displacement changes of X1, Y1, X2, Y2, and $\Delta x$ of the standard bar 20 that are detected by the sensor module 30 are transmitted to the calculation unit 40 in electrical or wireless connection, and substituted with the known values of the assembling length L and the gain value K into the following error program to calculate out the six degrees of freedom error of the spindle 11 and the rotation axis of the platform 12:

The radial error in the X-axis direction: $\delta_x(\theta)=X1$;
The radial error in the Y-axis direction: $\delta_y(\theta)=Y1$
The radial error in the Z-axis direction: $\Delta z=K*\Delta x$;
The angle deflection error (wobble): $\alpha=\tan^{-1}(\sqrt{(X_2-X_1)^2+(Y_2-Y_1)}/L)$.

The angle positioning error in the X-axis direction:

$$\varepsilon_x(\theta) = \tan^{-1}\left(\frac{X_2 - X_1}{L}\right);$$

The angle positioning error in the Y-axis direction:

$$\varepsilon_y(\theta) = \tan^{-1}\left(\frac{Y_2 - Y_1}{L}\right).$$

When the detecting method is executed by the optical detecting apparatus for detecting a degree of freedom error of the present invention, there are two assembling manners: a first assembling manner is assembled the sensor module 30 on the bottom end of the spindle 11 of the machine tool 10 and assembled the standard bar 20 on the platform 12 of the machine tool 10. The first assembling manner may detect four degrees of freedom error of the spindle of the powered machinery, and respectively $\delta_x(\theta)$, $\delta_y(\theta)$, $\Delta z$, and the angle deflection error (wobble '$\alpha$). A second assembling manner is assembled the standard bar 20 on the bottom end of the spindle 11 of the machine tool 10 and assembled the sensor module 30 on the platform 12 of the machine tool 10. The second assembling manner may detect six degrees of freedom error of the rotating spindle of the powered machinery, and respectively $\delta_x(\theta)$, $\delta_y(\theta)$, $\Delta z$, $\varepsilon_x(\theta)$, $\varepsilon_y(\theta)$, and the angle deflection error (wobble '$\alpha$).

The optical detecting apparatus for detecting a degree of freedom error of a spindle and the detecting method thereof as described has the following advantages. The shape of the standard bar 20 is easy to manufacture, and the elements that are adopted for the sensor module 30, such as the primary detecting group 34 and the minor detecting group 35, are generally common optoelectronic elements. Therefore, the dynamic error detection device that is composed by the standard bar 20 and the sensor module 30 and the method of implementation are more inexpensive, and the risk of the possibility of implementation of the spindle 11 of the dynamic detection machine tool 10 can be drastically reduced. In the future, it is possible to detect the precision of the spindle and the rotation axis of various powered machinery, to enhance the industry's high-speed rotation of the dynamic mechanical spindle error analysis of the general, and to enhance the power of mechanical precision or machine tool processing accuracy.

In the present invention, it is possible to detect the error changes of the spindle and the rotation axis rather than only detect the displacement changes of X-, Y- and Z-axes, and this may greatly improve the convenience of the present invention applied to the spindle and the rotation axis of the powered machinery, and widely used in the on-line detection of power machinery, when the detection of the present invention can be used to detect at least six degrees of freedom error.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An optical detecting apparatus for detecting a degree of freedom error of a spindle of a powered machinery with X-, Y- and Z-axes, and the optical detecting apparatus comprising:
   a standard bar being a straight rod and having
      a bottom end;
      a rod lens being cylindrical; and
      a reflection face formed on the bottom end of the standard bar; and
   a sensor module operated with the standard bar and having
      a magnetic mount;
      a supporting base deposited on the magnetic mount;
      a sensor frame deposited around the supporting base to form a measurement area between the supporting base and the sensor frame for the standard bar inserting into the measurement area, and having
         an primary detecting group deposited on the sensor frame along the Z-axis of the powered machinery and having
            a first laser head deposited on the sensor frame along the X-axis of the powered machinery;
            a second laser head deposited on the sensor frame along the Y-axis of the powered machinery;
            a first spot displacement sensor deposited on the sensor frame along the X-axis of the powered machinery and being opposite to the first laser head to receive a laser light of the first head via the rod lens; and
            a second spot displacement sensor deposited on the sensor frame along the Y-axis of the powered machinery and being opposite to the second laser head to receive a laser light of the second head via the rod lens;
         a minor detecting group deposited on the sensor frame along the Z-axis of the powered machinery with a spaced interval relative to the primary detecting group and having
            a third laser head deposited on the sensor frame along the X-axis of the powered machinery;

a fourth laser head deposited on the sensor frame along the Y-axis of the powered machinery;

a third spot displacement sensor deposited on the sensor frame along the X-axis of the powered machinery and being opposite to the third laser head to receive a laser light of the third head via the rod lens; and a fourth spot displacement sensor deposited on the sensor frame along the Y-axis of the powered machinery and being opposite to the fourth laser head to receive a laser light of the fourth head via the rod lens;

an oblique laser head deposited on the supporting base and having a free end extending inwardly and upwardly in the measurement area; and a reflected spot displacement sensor deposited on the supporting base in the measurement area and having a receiving face to receive a laser light of the oblique laser head that is reflected by the reflection face of the standard bar.

2. The optical detecting apparatus as claimed in claim 1, wherein the sensor frame has four mounting boards, two of the mounting boards are deposited on the supporting base and face to each other along the X-axis of the powered machinery, the other two mounting boards are deposited on the supporting base and face to each other along the Y-axis of the powered machinery, and each one of the four mounting boards has an upper portion and a lower portion;

the measurement area is formed in the sensor module between the four mounting boards;

each one of the first laser head, the second laser head, the first spot displacement sensor, and the second spot displacement sensor is mounted on one of the four mounting boards of the sensor frame; and each one of the third laser head, the fourth laser head, the third spot displacement sensor, and the fourth spot displacement sensor is mounted on one of the four mounting boards of the sensor frame.

3. The optical detecting apparatus as claimed in claim 2, wherein the primary detecting group is deposited on the sensor module at the upper portions of the four mounting boards;

the minor detecting group is deposited on the sensor module at the lower portions of the four mounting boards;

the standard bar has an upper portion and a loser portion, wherein the standard bar inserts into the measurement area, the upper portion of the standard bar is deposited adjacent to the primary detecting group, and the lower portion of the standard bar is deposited adjacent to the minor detecting group;

the reflection face of the standard bar is deposited above the oblique laser head and the reflected spot displacement sensor; and the laser light of the oblique laser head emits on a center of the reflection face and reflects to focus on a center of the receiving face.

4. The optical detecting apparatus as claimed in claim 3, wherein the oblique laser head and the reflected spot displacement sensor are symmetrically deposited in the measurement area of the standard bar;

the oblique laser head is an obliquely cylindrical element and has an angle between an axis line of the oblique spot laser head and the horizontal plane being 45 degrees;

the reflected spot displacement sensor is an obliquely cylindrical element; and the receiving face is deposited on a free end of the reflected spot displacement sensor and has an angle relative to the horizontal plane being 45 degrees.

5. The optical detecting apparatus as claimed in claim 4, wherein each one of the spot displacement sensors is selected from one-dimensional photoelectric sensor, two-dimensional photoelectric sensor, position sensor, CCD sensor, and CMOS sensor.

6. The optical detecting apparatus as claimed in claim 3, wherein each one of the spot displacement sensors is selected from one-dimensional photoelectric sensor, two-dimensional photoelectric sensor, position sensor, CCD sensor, and CMOS sensor.

7. The optical detecting apparatus as claimed in claim 2, wherein each one of the spot displacement sensors is selected from one-dimensional photoelectric sensor, two-dimensional photoelectric sensor, position sensor, CCD sensor, and CMOS sensor.

8. The optical detecting apparatus as claimed in claim 1, wherein each one of the spot displacement sensors is selected from one-dimensional photoelectric sensor, two-dimensional photoelectric sensor, position sensor, CCD sensor, and CMOS sensor.

* * * * *